United States Patent [19]

Muller et al.

[11] Patent Number: 4,792,515

[45] Date of Patent: Dec. 20, 1988

[54] ERASABLE DIAZOTYPE MATERIAL

[75] Inventors: Peter Muller; Henry Mustacchi, both of Port Washington; George Schmitz, Roslyn Heights, all of N.Y.

[73] Assignee: Andrews Paper & Chemical Co., Inc., Port Washington, N.Y.

[21] Appl. No.: 1,393

[22] Filed: Jan. 8, 1987

[51] Int. Cl.[4] ........................... G03C 1/52; B32B 9/04

[52] U.S. Cl. .................................... 430/160; 430/168; 430/176; 428/485; 428/514; 428/918

[58] Field of Search ........................ 428/485, 514, 918; 430/160, 162, 168, 169, 176

[56] References Cited

U.S. PATENT DOCUMENTS 3,923,518 12/1975 Muller ................................ 428/520
4,058,399 11/1977 McNeil et al. ...................... 427/424
4,500,598 2/1985 Thoese ............................... 428/514
4,569,888 2/1986 Muller ................................ 428/918

OTHER PUBLICATIONS

Peter Muller, "Precoating of Diazotype Paper," Tappi, vol. 48, No. 8, pp. 55A-59A.

*Primary Examiner*—P. C. Ives
*Attorney, Agent, or Firm*—Kane, Dalsimer, Sullivan, Kurucz, Levy, Eisele and Richard

[57] ABSTRACT

Erasable diazotype second originals on a translucent base have become very popular because they permit correcting, deletions and additions of new information to drawings without the need to redo an entire drawing. A new barrier film composition that acts simultaneously as matrix for the diazotype coating components and controls the ease of mechanical erasure is disclosed. The second originals exhibit almost film like reprographic continuity.

6 Claims, 1 Drawing Sheet

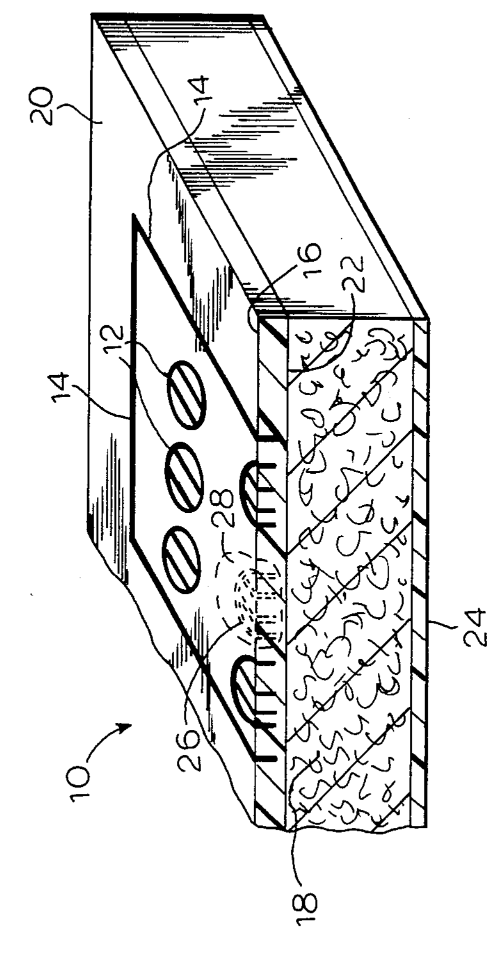
20
14
16
22
12
14
28
24
26
10
18

ERASABLE DIAZOTYPE MATERIAL

BACKGROUND OF THE INVENTION

1. Field of the Invention

The invention relates to diazotypes and more particularly relates to erasable diazotype reproduction materials and the method of their preparation.

2. Brief Description of the Prior Art

Diazotypy is a process for making copies from translucent originals by exposing them in contact with a diazotype copying sheet to ultraviolet light and by developing the diazotype sheet thereafter with ammonia or a liquid developer. The diazotype process because of its ease and economics has found wide application during the last 50 years and its principles are well known; see "Light-Sensitive Systems" by Jaromir Kosar, John Wiley & Sons, Inc., New York (1965).

Diazotype copying materials are made by applying a light-sensitive diazo coating to the surface of a base, such as foils, opaque paper, translucent paper, or cloth. The active components of the light-sensitive coating are monomolecular, crystalline, not self-supporting and need a resinous or a fibrous substance as a support.

If paper is used as the base support, the diazotype coating penetrates into and disperses in the top layer of the paper and the diazotype print lines of the final copy are well anchored within the fibrous structure of the paper.

Diazo copies in the engineering field are often used for further design work, and it is desirable that corrections of print lines be made easily and not cut noticeably into the paper, thus damaging it for further markings. Corrections have been made in the past through the use of chemical eradicator solutions which destroy the print line through reduction or oxidation of the print dye. However, such chemicals also attack the paper base to a certain degree and leave a cockled and discolored spot that often shows up on reprinting as an undesired marking. Corrections on diazotypes are often required on intermediate diazotype prints, also called "reproducibles" or "second originals". These are diazotypes coated on a translccent base and the print lines are composed of one or more dyes which are opaque to ultraviolet light.

Erasable diazotype materials and their manufacture have been disclosed and described in U.S. Pat. Nos. 3,923,518 and 4,058,399. Diazotype materials prepared with these processes are easily erasable, but prints are often not resistant to Scotch tape which, when removed, pulls off all or a substantial part of the coating layer. Prints are also very sensitive to scratching. Even light scratching of the print surface with a finger nail removes the entire coating in the contact zone. Such coatings also exhibit a certain grainness which affects print line continuity and makes them substantially inferior to film coatings for reprinting applications.

Erasable diazotype materials of the prior art can be considered as a base material with laminated layers which are prepared by applying to a mostly transparent, paper base, a barrier coating which is impervious to the components of a single or double oeercoating with pigments, resins and diazotype materials. The barrier coatings excluded polyvinylacetates which exhibit some affinity to diazotype components. After image exposure, such materials are developed (mostly with hot ammonia) in conventional diazotype copying machines. Developed copies can be erased for necessary corrections. Handling of the material during the copying steps and afterwards usage for making reprints requires mechanical stability of the material so that no valuable information on the print is deleted.

The above-described prior art processes depend on a precarious balance of the composition of the coating layers.

The barrier layer resins have no affinity to the overcoating which adheres to the barrier layer by purely adhesive forces. The reprographic element of these materials is contained in the overcoatings with a resin system that has an adequate affinity to the azodyes of the developed prints, the affinity being increased by (mainly) silica pigments.

An inherent problem of such coating systems is the precarious balance between resin and pigment concentration that finally control erasability, rate of development, print contrast, ease of processing and mechanical print surface resistance.

Higher resin concentrations improve mechanical resistance, but affect negatively erasability, rate of development and passage through hot developing equipment.

Higher pigment concentrations improve rate of development, print contrast (up to a certain limit) and ease of erasability, but decresse mechanical print surface resistance.

Moreover, coating defects such as streaks or orange peel effects occur easily due to the necessary relatively heavy coating weight.

The azo print dye is not truly "dissolved" in the pigment-resin matrix of the overcoating, but the dye particles are rather dispersed and generate a certain degree of print dye graininess which reproduces on reprints in the form of lesser print line continuity.

The present invention overcomes all of the above shortcomings and provides diazotype second originals on translucent paper, which excel by a fine grain reproduction with high reprint contrast and which process easily through conventional printing and developing equipment. They can be easily erased, but are resistant to scratching, shop handling, rubbing and Scotch tape removal.

SUMMARY OF THE INVENTION

The invention comprises an erasable diazotype reproduction material which comprises;

a base sheet having applied to at least one surface thereof a coating which comprises a mixture of polyvinyl acetate resin and a compound selected from the group consisting of an oxidized polyethylene, and a paraffin wax;

said coating having a lower zone bonded to the base sheet and an upper zone distal to the base sheet;

said upper zone having dispersed therein diazotype components comprising a light-sensitive diazonium compound, an azo coupling compound and a pH stabilizing acid.

The invention also comprises a method of manufacturing the reproduction material of the invention.

The reproduction materials of the invention provide diazotype second originals with controlled erasability from substantially aqueous coating preparations. They exhibit print line continuity comparable to diazotype films and have a print surface that withstands rubbing, finger nail scratching and Scotch tape removal.

BRIEF DESCRIPTION OF THE DRAWING

The FIGURE is a greatly enlarged fragmentary view, partially in section, with various coating layers broken away, of an embodiment diazo reproduction material of the invention.

DETAILED DESCRIPTION OF THE PREFERRED EMBODIMENTS OF THE INVENTION

The base support for easy erasable diazotypes of the invention may be chosen from among all conventional bases used for diazotypes, such as, for example, opaque and translucent papers, cloth, polymeric films and the like. While in the case of certain films, such as polyester films, a penetration of the resin coating into the base is limited, such may be useful for certain purposes The preferred base support however is transparent or transparentized paper.

The invention is applicable to many kinds of transparent base papers such as conventional rag and sulfite transparent and transparentized paper as well as to natural papers which can be transparentized in a third step with aqueous dispersions of paraffin wax with or without polyvinyl acetate or resin or with organic solvent resin solutions applied to the backside of the sheet. The invention thus also permits the manufacture of easily erasable diazotype transparencies from natural non-transparent base paper in one pass through a conventional aqueous coating machine equipped with two front side and one backside coating stations.

In an initial step of the method of the invention, a resin coating is applied to the surface of the base support. The coating is advantageously obtained from an aqueous dispersion containing polyvinyl acetate and oxidized polyethylene and/or a paraffin wax.

After drying of the coating, the resin film layer so formed may be overcoated with a substantially aqueous solution containing diazotype components and some polaric organic solvents or a solvent mixture to cause the water-solvent vehicle to swell the polyvinyl acetate component of the film coating layer sufficiently to absorb and accommodate the diazotype chemicals uniformly in the upper or exposed surface of the resin film coating.

Any of the commercially available aqueous dispersion of poly(vinyl acetates) may be used in the present invention; advantageously one with a density of circa 1.0 to 1.2 gms/1 $cm^3$.

The oxidized polyethylene dispersions employed in the method and diazotype materials of the invention are well known as are methods of their preparation. Representative of oxidized polyethylene are low and high pressure, low density polyethylenes, i.e.; those having a density of circa 0.80 to 0.93 gms/$cm^3$.

Advantageously, the oxidized polyethylene and wax components of the compositions are prepared by dispersing the molten components in an aqueous phase with the help of anionic, nonionic or cationic emulsifiers in a well known manner and cooling the dispersion to room temperature.

A certain amount of fatty acid amides or bisamides may be dissolved in the molten components prior to their dispersions in water, in order to reduce the surface friction of the oxidized polyethylene.

Oxidized polyethylenes are preferred over non-oxidized polyethylenes because the generated carboxyl and hydroxyl functions improve the stability of their aqueous dispersions.

With the melting temperature ranges of the oxidized polyethylenes in the range slightly above 100° C. and of the fatty acid bisamides around 140° C., the coating surface of the coating layer does not risk to become tacky under the print processing conditions of diazotypes.

The paraffin waxes preferably used in the method and the materials of the invention, both natural and synthetic, are well known compounds available commercially such as paraffin waxes with melting points of 50° C. to montan waxes melting at 90° C. or carnauba wax melting around 85° C.

The ratios of the functional components of the coating (dry substance) may vary. When polyvinyl acetate and waxes are used their ratios may be between 10:1 to 10:7.

The same ratios are applicable when polyvinylacetate and oxidized polyethylene are used. The same ratios are also applicable when polyvinylacetate is used with a mixture of oxidized polyethylene and waxes, and the ratio of the mixture of oxidized polyethylene and waxes may vary between 10:2 and 2:10.

In case that fatty acid amides or bisamides are incorporated, their portion may be between 0.5% and 10% of the total coating layer dry substance.

For an easy and clean erasure the preferred ratio between polyvinyl acetate and oxidized polyethylene and or wax components is from 10:2 to 10:5 and the total dry coating weight between 8 and 15 g/$m^2$ of base support surface.

It is preferred to keep the wax component low as high concentrations may soften under the heat from erasure friction with the result of some smearing marks.

The overcoating of diazo components is advantageously a waterdispersed mixture containing, essentially, a light-sensitive diazonium compound, an acid stabilizer and an azo coupler.

The diazo coating compositions used include any conventional, light-sensitive diazonium compound. Aromatic diazo compounds of more or less pronounced yellow color and which absorb ultraviolet light to undergo a photolytical decomposition to colorless products are advantageously used. Such diazonium compounds and the method of their preparation are well known in the art. Representative of diazonium compounds used in the invention are:

1. Derivatives of 1-diazo-4-amino benzene with or without alkyl, oxylalkyl or halogen substitutions in the benzene ring and with alkyl or dialkyl or acyl or acylalkyl substitution on the amino nitrogen or with the amino nitrogen forming a member of a heterocyclic ring with or without a second thereto atom of oxygen or nitrogen.

2. Derivatives of 1-diazo-4-alkylaryl mercapto benzene with or without substitution in the benzene ring.

3. Derivatives of 1-diazo-4-phenyl benzene with and without substitution in the phenyl and in the benzene rings.

4. 2-diazo-1-hydroxy-npahthalene-5-sulfonic acid, and the like.

An acid stabilizer is a necessary ingredient of the overcoat compositions. Any of the well known acid stabilizers previously used in light-sensitive diazo coating compositions may be used. Representative of such acid stabilizers are citric acid, tartaric acid, hydrochloric acid, sulfuric acid, boric acid, mixtures thereof and the like.

In preferred coating compositions, azo couplers are mixed with the diazonium compounds in an acid environment to prevent precoupling. When changing the pH from an acid to an alkaline pH, the coupling reaction occurs to produce an azo dye as is known in the art. Azo couplers are generally aromatic compounds with phenolic hydroxyl groups with or without other substituent groups. The couplers are generally colorless. Representative of azo couplers are:

1. Resorcinol and its halogen and alkyl derivatives and ethers;
2. Resorcylic acids with or without halogen substitution in the ring and their amides and substitutes amines;
3. Dihydroxy naphthalene mono sulfonic acids and disulfonic acids;
4. Dihydroxy haphthalenes;
5. Beta and alpha-hydroxy naphthoic acid amides and substituted amides;
6. Compounds with active methylene groups such as aceto-acet derivatives and cyano acet derivatives;
7. Mono and poly hydroxy biphenyls;
8. Poly hydroxy biphenyl sulfides;
9. Pyrazolone derivatives;
10. Amino phenol derviatives; and the like.

The light-sensitive diazo coating compositions may also contain any number of additional ingredients conventionally used in the preparation of prior art light-sensitive coating compositions such as, for example, solubilizers, fillers, stabilizers, accelerators, solvents, anti-oxidants, contrast controlling compounds and the like.

The proportions of the various components of the diazo overcoat compositions may be those proportions conventionally used in their use prior to this invention, in the preparation of diazo light-sensitive compositions (where they were so used). These proportions are well known to those skilled in the art; see for example the disclosures of Kosar, supra and of U.S. Pat. Nos. 3,923,518 and 3,996,056. In general, sufficent azo coupler is employed to couple all of the diazonium compound and sufficient stabilizer to maintain an acid pH.

The diazo compositions used in the invention may be prepared by simple admixture of the ingredients in a suitable mixing vessel. Preferably the diazo compositions are prepared by admixture in an aqueous media for use as an aqueous coating mixture to prepare diazotype reproduction materials of the invention. The order of mixing is not critical.

The diazotype reproduction materials of the invention may be prepared by coating aqueous mixtures of the diazo compositions described above on the resin coated base support material, using conventional diazo coating apparatus. The techniques are well known; see for example U.S. Pat. Nos. 3,923,518 and 3,996,056. In general, the application of the coating of polyvinyl acetate and associated compounds to a base support may be made on any type of conventional coating equipment. A kiss roller coater with air knife or scraper bar coating heads is useful when the coating is to be applied from an aqueous dispersion. Kiss rollers with or without wire bar or counterroller coating heads are also applicable. Diazotype or blueprint coating machines equipped with applicable coating heads are very useful as they also can serve for the consecutive overcoating with the diazotype components. The wet coating layers thus applied dry very easily, but they are scratch sensitive by nature and any scraping action during the drying process and before it is overcoated with diazotype.

After drying of the diazo composition overcoat, a film-like coating layer is obtained that can be imagewise exposed. The diazo material processes easily and develops readily in conventional diazotype copying machines and produces prints with excellent line continuity that can be easily erased, are resistant to scratching, to Scotch tape removal and shop handling.

The diazotype materials so obtained have a glossy surface. Various degrees of matte can be obtained through incorporation of appropriate matting pigments into the lacquer and sensitizing solution.

Even if added to the sensitizing coating, the pigments need no extra resin binder, but are accommodated and retained as the vehicle of the sensitizing coating swells the undercoating The method of the invention thus comprises a two-step substantially aqueous coating process that generates a partially impregnated, but not thoroughly penetrated film layer with built-in adhesion control to the base and with appropriate mechanical compactness and strength to resist damage in usage.

The usage of a vehicle for the diazotype sensitizing preparation that swells the resin film-like undercoating without being a true solvent for the undercoating is an important feature of the invention. In this manner, the diazotype chemicals can be embedded into the upper portion or zone of the undercoating. They cannot penetrate into the base paper, but are close to the exposed surface and readily accessible to the developing agent which contacts the print surface.

The preferred vehicle is a mixture of water with water mixable (polaric) organic solvents containing between 60 and 90% water. The preferred polaric solvents are alcohols and glycol ethers and their mixtures. Other polaric solvents, however, may also be used such as lactones, dimethylformate or any others that in mixture with water have a swelling effect on the undercoating without dissolving it.

Referring now to the embodiment of the FIGURE, a diazo reproduction 10 is depicted fully developed. Indicia 12 and lines 14 are formed in the developed diazo sensitized upper zone 16 of layer 20. A support base sheet 18, which may be any of the base sheets used for diazotypes, is coated on its upper surface with layer 20. As previously indicated, layer 20 is formed by polyvinyl acetate resin polymer and may have been applied in the form of an aqueous dispersion or emulsion and may contain other components as discussed above to modify the characteristics of layer 20.

A backcoating 24 is applied to the lower surface of base sheet 18 to prevent curling of the coated base sheet after drying.

In the cut-away section of the FIGURE indicia 12 is depicted as being erased. The erased indicia 26 illustrates the condition of the layer 20, and the diazo zone 16 of layer 20 after the indicia has been erased. The erased indicia 26 is rubbed away and shows as a cavity 28 extending through the diazo sensitized zone 16 and into the lower zone 22. It should be noted that in practice the diazo sensitized zone 16 and zone 22 are integrally bonded as a single layer to the base sheet 18 to prevent wet rub off during initial processing and also during reprocessing after a new indicia has been added to replace the erased indicia at 26. Since erased indicia 26 do not penetrate into the upper surface of base sheet 18 there is no "ghosting".

The following examples describe the manner and method of making and using the invention and set forth the best mode contemplated by the inventor but are not to be construed as limiting. All parts specified are by weight unless otherwise stated.

Where specified, test results were obtained by the following procedures.

Accelerated Aging Test:

Diazotype sheets are exposed for one week at 50° C. to an atmosphere of 75% relative humidity. Thereafter they are half covered with a black opaque sheet and exposed to UV light in the printing section of a diazo copying machine, sufficiently to decompose all diazo in the non-covered area. The sheets are then fully developed with ammonia by passing the diazotype sheet through the developing section of a diazotype copying machine. A fresh sheet of the same diazotype paper is also half covered with a black opaque sheet and printed and developed in the same manner. The resulting prints are then measured in a Photo Volt Reflection Densitometer to determine the reflection densities of the bleached out areas (whites) and of the fully-developed areas (full tones). The differences of reflection densities from the aged and non-aged sheets of the white areas are recorded as print background discoloration from aging and of the full tones as print dye loss from aging. The aging test with a 50% relatively humidity (R.H.) atmosphere, in general, reflects a normal shelf life of three months. The aging test with a 75% R.H. atmosphere reflects behaviour under extremely adverse conditions.

EXAMPLE 1

A 100% rag natural paper of 53 g/m$^2$ basis weight was impregnated with a 40% solution of styrene dimer in toluene and dried to obtain a translucent base paper sheet with a basis weight of 60 g/m$^2$.

The transparentized paper was placed on a conventional diazotype coating machine equipped with a two front side-and one backside airknife coating stations and three drier passes (one after each coating application).

In the first coating station the following preparation was applied with a kiss roller and airknife:

| | |
|---|---|
| water | 3,000 ml |
| aqueous dispersion of polyvinylacetate (45% solids) | 4,500 ml |
| aqueous dispersion of (32% solids) of 17% oxidized polyethylene (m.p. 108° C.) 7% paraffin wax (m.p. 55° C.) 7% moutan wax (m.p. 85° C.) 1% fatty acid bisamide (m.p. 140° C.) | 1,500 ml |
| water enough to bring total volume to | 10,000 ml |

The paper immediately thereafter entered the second kiss roller-airknife coating station which applied the following diazo sensitizing preparation, to the coated side of the paper:

| | |
|---|---|
| water | 2,500 ml |
| Isopropyl alcohol | 2,500 ml |
| ethylene glycol monobutylether | 500 ml |
| 5-sulfosalicylic acid | 150 g |
| diresorcinol sulfide | 30 g |
| coupler 603* | 150 g |

-continued

| | |
|---|---|
| 5-chlororesorcinol | 70 g |
| diazo 59s** | 300 g |
| diazo 88*** | 100 g |
| thiourea | 50 g |
| zinc chloride | 250 g |
| wetting agent | 50 g |
| water, to complete to | 10,000 ml |

*Trade name of Andrews Paper & Chemical Co. for 2,5-dimethyl-4-morpholino methyl phenol.
**Trade name of Andrews Paper & Chemical Co. for 1-diazo-2,5-diethoxy-4-morpholino-benzene bisulfate.
***Trade name of Andrews Paper & Chemical Co. for 1-diazo-3-methyl-4-pyrrolidino-benzene chloride, zinc chloride.

The wet coating layer was dried and the dried paper was led into the back coating station where the following preparation was applied, for curl control, with a kiss roller and an airknife:

| | |
|---|---|
| water | 10,000 ml |
| citric acid | 20 g |

The paper was dried again to 3.5% residual moisture and wound up.

A sample of the finished treated paper was used to make a contact copy from a translucent master in a commercial diazotype copying machine with ammonia development. A print with deep brown lines on a translucent background is obtained. The treated paper processed through the developing section of the copying machine without difficulties and the surface did not smear. The obtained copy is well suited to serve as a second original to make further copies.

Print lines were found to erase easily with a rubber eraser without damaging the transparentized base sheet and the erased areas were well receptive to added information by pencil and ink.

The print dye coverage after development was excellent in full tone- and in half tone areas with a very fine grain resembling that of diazotype films.

Scotch tape applied to the film could be removed without lifting print dye.

Scratching of the print surface with the fingernail left only very slight fingernail marks without removing any print dye.

EXAMPLE 2

This is not an example of the invention but is made for comparative purposes.

When Example 1 was repeated, but without the incorporation of the aqueous dispersion of oxidized polyethylene and paraffin wax, the prints obtained were difficult to erase. Otherwise prints performed similarly to to the one of Example 1, supra.

EXAMPLE 3

Example 1 was repeated, but with a replacement of the aqueous dispersion of oxidized polyethylene and waxes by an aqueous dispersion of paraffin wax (m.p. 55° C.) of 45% solids.

When only 500 ml of the paraffin wax dispersion was used, prints could be erased with more of a physical effort than was the case for Example 1, supra, but they erased substantially more easily than those of Example 2, supra.

When 1500 ml of the paraffin wax dispersion were used, the prints thus obtained erased easily as prints from Example 1, supra, when a relatively hard rubber eraser was used. With a softer eraser, more rubbing was required and some smearing occurred, probably from the heat generated from the rubbing action resulting in a melting of the paraffin.

EXAMPLE 4

Example 1, supra, was repeated, but instead of the transparentized 100% rag base, a natural transparent paper manufactured by Gebrueder Hoesch in West Germany under the brand name DIAMANT with a basis weight of 85 g/m$^2$ was used, and the composition of the first coating was replaced by the following one:

| | |
|---|---|
| water | 2,000 ml |
| diethylene glycol | 1,000 ml |
| aqueous dispersion of polyvinylacetate (45% solids) | 4,500 ml |
| aqueous dispersion (32% solids) | 1,500 ml |
| 20% oxidized polyethylene wax | |
| 10% paraffin wax (m.p. 65° C.) | |
| 2% fatty acid bisamide (m.p. 140° C.) | |
| isopropyl alcohol | 750 ml |
| water enough to bring total volume to | 10,000 ml |

and the back coating was replaced by the following solution:

| | |
|---|---|
| water | 9,000 ml |
| diethylene glycol | 1,000 ml |
| citric acid | 25 g |

The sensitized paper obtained exhibited hardly any curl and the prints performed identical to the ones of Example 1, supra.

EXAMPLE 5

Example 1, supra, was repeated, but instead of the transparentized 100% rag base, a natural 100% rag paper having a 14 lb basis weight was used and instead of the backcoating of water and citric acid, an aqueous transparentizing preparation was applied:

| | |
|---|---|
| water | 2,500 ml |
| aqueous 32% solids dispersion of paraffin wax (melting point of 55° C.) | 6,000 ml |
| aqueous 45% solids dispersion of polyvinylacetate | 1,000 ml |
| diethylene glycol | 500 ml |

After drying, a diazotype intermediate was obtained which exhibited the same reprint translucency on a material obtained from Example 1, supra, and prints were as easily erasable.

EXAMPLE 6

This is not an example of the invention but is made for comparative purposes.

A natural 100% rag paper having a 14 lb basis weight was coated in the same coating machine as Examples 1 through 5, supra, but with the following preparations:

| | |
|---|---|
| First Coating | |
| water | 7,000 ml |
| silica (1 micron partile size) | 500 g |
| aqueous dispersion of polyvinylacetate (45% solids), supra. | 800 ml |
| water enough to complete to | 10,000 ml |
| Second Coating | |
| water | 7,000 ml |
| isopropyl alcohol | 100 g |
| 5-sulfosalicylic acid | 150 g |
| coupler 603, supra | 150 g |
| 5-chlororesorcinol | 100 g |
| diazo 59s, supra | 300 g |
| diazo 88, supra | 100 g |
| thiourea | 50 g |
| zinc chloride | 250 g |
| wetting agent | 10 g |
| water, to complete to | 10,000 ml |
| Third Coating | |
| water | 3,000 ml |
| aqueous 32% solids dispersion of paraffin wax (melting point of 55° C.) | 6,000 ml |
| aqueous 45% solids dispersion of polyvinylacetate, supra. | 1,000 ml |

After drying, a diazotype intermediate was obtained which exhibited a similar reprint translucency as the material obtained from Example 1, supra, but print lines were much less continuous and not erasable.

EXAMPLE 7

In an accelerated print aging test, prints from Examples 1 through 6 were exposed to an atmosphere of 75% R.H. at 50° C. for one week.

The print dye from Example 6 migrated through the paper while this did not happen with the prints from Examples 1 and 3 (which did not lose their erasability feature).

The results from the above examples clearly show a novel technology for the manufacture of easy erasable diazotype intermediates, by imbedding the diazotype components into a stratified matrix which does not intermingle with its base and which matrix has a built-in adhesion control for easy erasure.

The economic advantages of the invention permit the manufacture of easy erasable intermediates with low cost base papers and in a one pass operation with substantially aqueous preparations on a conventional three-station coating machine.

What is claimed is:

1. An erasable diazotype reproduction material, which comprises;

a base sheet having affixed to at least one surface thereof a coating which consists essentially of a mixture of polyvinylacetate resin and a compound selected from the group consisting of oxidized polyethylene, and a paraffin wax;

said coating having a lower zone in contact with and bonded directly to the base sheet and an upper zone distal to the base sheet;

said upper zone having dispersed therein diazotype components comprising a light-sensitive diazonium compound, an azo coupling compound and a pH stabilizing acid.

2. The erasable diazotype reproduction material of claim 1 wherein said base sheet is paper.

3. The erasable diazotype reproduction material of claim 1 wherein said base sheet is a transparentized base sheet.

4. A material of claim 1 which comprises pretransparentized paper base.

5. A material of claim 1 which comprises a natural transparent paper base as obtained through extensive beating and refining of cellulose furnish prior to the sheet formation.

6. A stratified erasable diazotype material which, comprises; a natural base paper transparentized with an aqueous paraffin wax dispersion and coated with a layer consisting essentially of a polyvinyl acetate resin intermingled with a compound selected from the group consisting of an oxidized polyethylene resin or paraffin wax and having imbedded in it diazotype components consisting of a light-sensitive aromatic diazo compound, a stabilizing acid and an azo coupling compound.

* * * * *